United States Patent [19]
Kasahara et al.

[11] Patent Number: 5,660,775
[45] Date of Patent: Aug. 26, 1997

[54] METHOD OF TREATING WASTE MAGNETIC TAPES AND METHOD OF MANUFACTURING BUILDING MATERIAL BOARDS USING THE TREATED MATERIAL

[75] Inventors: Kanesuke Kasahara, Atsugi; Shunsai Nagai, Tottori-ken; Kohei Takanishi, Yonago, all of Japan

[73] Assignee: Fuji Kasei Kogyo Co., Ltd., Tottori-ken, Japan

[21] Appl. No.: 481,497

[22] PCT Filed: Jan. 7, 1993

[86] PCT No.: PCT/JP93/00008

§ 371 Date: Aug. 28, 1995

§ 102(e) Date: Aug. 28, 1995

[87] PCT Pub. No.: WO94/15767

PCT Pub. Date: Jul. 21, 1994

[30] Foreign Application Priority Data

Jun. 20, 1991 [JP] Japan ................................. 3-174742

[51] Int. Cl.⁶ .......................... B29C 35/02; B29C 67/24
[52] U.S. Cl. .......................... 264/105; 264/104; 264/115; 264/345; 264/DIG. 69
[58] Field of Search ........................... 264/104, 105, 264/115, 140, 345, DIG. 69

[56] References Cited

FOREIGN PATENT DOCUMENTS

| 48-8877 | 2/1973 | Japan . |
| 53-40041 | 4/1978 | Japan . |
| 54-6080 | 1/1979 | Japan . |
| 54-29422 | 9/1979 | Japan . |
| 62-204906 | 9/1987 | Japan . |

*Primary Examiner*—Mary Lynn Theisen
*Attorney, Agent, or Firm*—Birch, Stewart, Kolasch & Birch, LLP

[57] ABSTRACT

The present invention provides a method of treating waste magnetic tapes characterized in that waste magnetic tapes such as video tapes and cassette tapes are cut or crushed to a length of 1 to 50 mm, and heated at a temperature of 100° to 200° C. so that they are contracted in the form of curl, and a method of manufacturing building material boards characterized in that waste magnetic tapes such as video tapes and cassette tapes are cut or crushed to a proper size, heated, and then, supplied with a binder and molded under pressure.

17 Claims, 1 Drawing Sheet

METHOD OF TREATING WASTE MAGNETIC TAPES AND METHOD OF MANUFACTURING BUILDING MATERIAL BOARDS USING THE TREATED MATERIAL

TECHNICAL FIELD

The present invention relates to a method of treating waste magnetic tapes and to a method of manufacturing building material boards using the treated material obtained thereby.

BACKGROUND ART

Although a huge amount of waste magnetic tapes of those such as video tapes and cassette tapes has been disposed of every year, heretofore, a method of recycling properly such waste tapes has not been found.

DISCLUSIVE OF THE INVENTION

The present invention proposes a method of treating the above-mentioned waste magnetic tapes and a method of manufacturing building material boards from the treated material.

SUMMARY OF THE INVENTION

The subject matter of the present invention is both a method of treating waste magnetic tapes characterized in that waste magnetic tapes of those such as video tapes and cassette tapes are cut or crushed to a length of 1 to 50 mm, preferably 3 to 10 mm, and heated at a temperature of 100° to 200° C., preferably 140° to 170° C. so that they are contracted in the form of curl, and a method of manufacturing building material boards characterized in that waste magnetic tapes of those such as video tapes and cassette tapes are cut or crushed to a proper size, heated, and then, supplied with a binder and molded under pressure.

In the above-mentioned method of manufacturing building material boards, waste magnetic tapes are cut or crushed to a length of 1 to 50 mm, preferably 3 to 10 mm. Where waste magnetic tapes are crushed to less than 1 mm, the cost of crushing is too expensive, and resulting products become powdery, so that a structure holding voids therein is not obtained. For more than 50 mm, the surface state of the products after being molded becomes rough and a lower strength is obtained, thereby providing no practicability.

The heating treatment is performed at a temperature of 100° to 200° C., preferably 140° to 170° C. At a temperature less than 100° C., the form of curl is not obtained. At a temperature more than 200° C., the products are deteriorated due to air oxidation and thus cannot be used.

As the above-mentioned binder, a material capable of being cured and molded at room temperature or by heating can be used such as latex, liquid rubber, polyethane adhesive, epoxy resin, melamine resin, phenolic type resin and urea resin.

The binder is added to waste magnetic tapes with 3 to 70 parts, preferably 10 to 50 parts by weight of the former to one part of the latter, and then both are mixed uniformly.

In manufacturing the above-mentioned building material boards, ferrite, carbon black, graphite, carbon fiber or conductive metallic powder having electromagnetic wave properties can be added to waste magnetic tapes, or conductive metallic fiber or conductive metallic wire mesh having a 12 to 100 mesh size can be mixed therein, for example, in a sandwich construction.

The above-mentioned ferrite includes spinel based one, garnet based one and magnet prumbite based one, which are individually or mixedly added to waste magnetic tapes with 100 to 150 parts, preferably 30 to 70 parts by weight of the former to one part of the latter.

As the above-mentioned carbon black, there can be used channel black, furnace black, acetylene black, thermal black, lamp black and the like, one of which is added to waste magnetic tapes with 1 to 100 parts, preferably 10 to 30 parts by weight of the former to one part of the latter.

As the above-mentioned conductive metallic powder, iron, stainless, copper, aluminum and the like can be individually used or mixed with carbon black, which are added to waste magnetic tapes with 10 to 150 parts, preferably 30 to 70 parts by weight of the former to one part of the latter.

As the above-mentioned conductive metallic fiber or conductive wire mesh, there can be used fiber of iron, stainless, copper, aluminum and the like, or wire mesh knitted from these fiber and having a 12 to 100 mesh size, which are mixed into waste magnetic tapes with 1 to 100 parts, preferably 10 to 30 parts by weight of the former to one part of the latter.

According to the present invention, waste magnetic tapes of those such as video tapes and cassette tapes are cut or crushed to a proper size.

To perform cutting or crushing, there can be used an impact type crusher having common fixed blades and rotting blades, for example, shown in FIG. 1.

In the figure, numeral 1 designates a hopper; 2, a rotting blade; 3, a fixed blade; 4, a screen; and 5, a crusher body.

Waste magnetic tapes are crumpled into a ball and placed from the hopper 1, and cut and crushed by the rotting blades 2 and the fixed blades 3.

The size of crushed (or cut) products can be arbitrarily selected by setting crushing conditions and the size of the mesh of the screen 4.

For example, the products to be crushed used for an experiment are crushed according to the following distribution in size:

| More than 5 mm | 1% |
| 3 to 5 mm | 40% |
| Less than 3 mm | 59% |

The above-mentioned products to be crushed, when heated under predetermined conditions, become crushed products including small pieces which have been contracted in the form of curl as shown in FIGS. 2A and 2B.

The building material boards of the present invention can be obtained by adding the binder as described above to the crushed products thus obtained, and by molding them under pressure so that they exhibit a proper density.

According to the method of treating waste magnetic tapes of the present invention, contracted pieces in the form of curl are obtained, which can be used not only for the material of the building material boards of the present invention, but also for, for example, a filler mixed into coating film, and the like.

Also, according to the method of manufacturing building material boards, there are obtained building material boards in which air is confined into the curl-shaped constracted pieces and thus voids exist, and which are excellent in sound absorbing and heat insulation performance, as well as static electricity preventive performance and electromagnetic wave absorbing performance, by adding the above-mentioned binder to the above-mentioned crushed products and molding them under pressure.

The building material boards of the present invention can be used as, for example, the wall, ceiling and floor of buildings, and since they have electromagnetic wave properties, they can be preferably used as an electromagnetic wave shield.

MODES OF CARRYING OUT THE INVENTION

Embodiments will be shown below, the following commodities were used as a binder:

1) Idemitsu Chemical Co., Ltd.: Modified liquid polybutadiene MC-50

2) Sumitomo Chemical Co., Ltd.: Urethane adhesive Sumistar-9902X

3) Sumitomo Dures Co., Ltd.: phenolic type resin liquid Resin PR-50404

[Embodiment 1]

Figure 1:
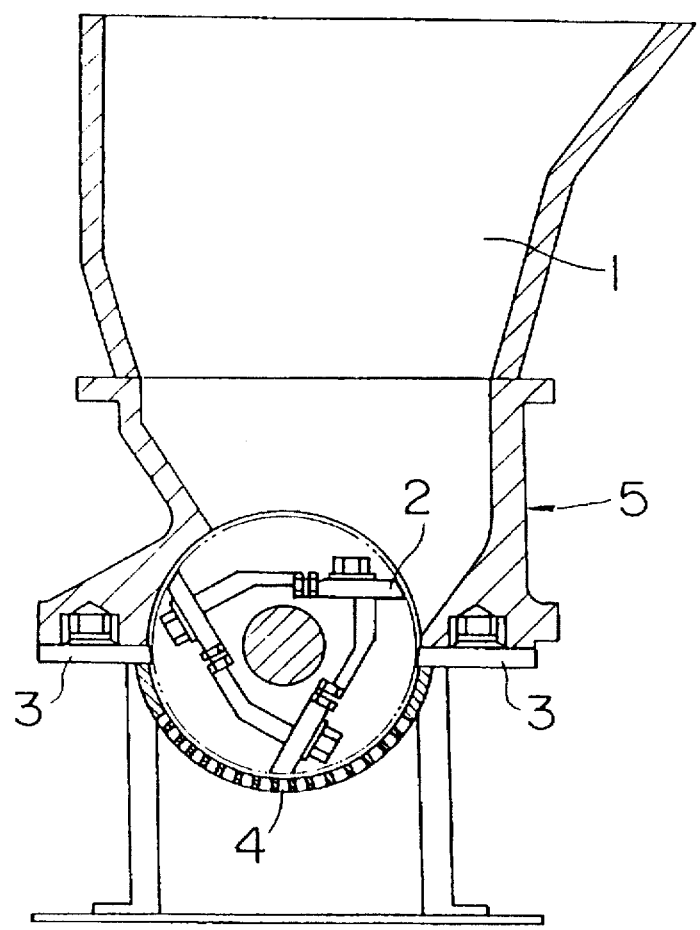
FIG. 1 is a principal portion sectional and elevational view showing an example of a crusher used in the present invention.
Figure 2A:
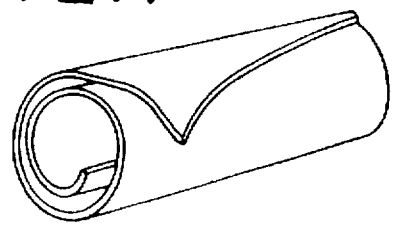
FIGS. 2A and 2B are illustrative views of curl-shaped contracted pieces of waste magnetic tapes formed by the treating method of the present invention. Best and Other Modes for Carrying Out the Invention
Figure 2B:
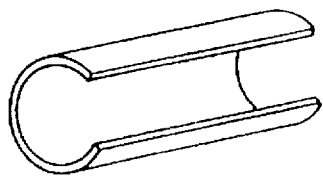

In the crusher shown in FIG. 1, waste magnetic tapes of cassette tapes were crushed to scaly pieces with a size of 5 mm or less. They were heated in an electric furnace heated to a temperature of 150°±5° C. for three minutes while being agitated, and those having contracted to exhibit a curl shape were used as a raw material, mixed uniformly in a Hensil mixer in the following blending ratio, placed into a transfer type mold, and heated under pressure at a temperature of 150° C. for 10 minutes in a hot press to mold.

| (Blending) | |
|---|---|
| Waste magnetic tapes heated: | 100 parts by weight |
| Moisture setting type liquid modified polybutadiene: | 20 parts by weight |
| Total | 120 parts by weight |

The physical properties of the building material boards thus obtained are as follows:

The damping factor in sound absorbing performance was measured by the falling ball floor impact test (measured by us).

| Density | 0.45 g/cm$^3$ |
|---|---|
| Compressive strength | 8.0 kg/cm$^2$ |
| Bending strength | 13.4 kg/cm$^2$ |
| Heat conductivity | 0.043 kcal/m °C. h |
| Attenuation in sound absorbing performance | 30 dB |
| Volume resistance | <1 × 10$^9$ Ω-cm |

By changing both the blending ratio of raw material to binder, and the kind of binders, building material boards were manufactures as shown in the following embodiments 2 through 5, and the physical properties thereof were evaluated.

[Embodiment 2]

| (Blending) | |
|---|---|
| Waste magnetic tapes heated: | 100 parts by weight |
| Spinel based ferrite: | 50 parts by weight |
| Moisture setting type liquid modified polybutadiene: | 30 parts by weight |
| Total | 180 parts by weight |
| (Physical properties) | |
| Density | 0.48 g/cm$^3$ |
| Compressive strength | 6.5 kg/cm$^3$ |
| Bending strength | 11.1 kg/cm$^2$ |
| Heat conductivity | 0.046 kcal/m °C. h |
| Attenuation in sound absorbing performance | 29 dB |
| Volume resistance | 3.1 × 10$^8$ Ω-cm |

[Embodiment 3]

| (Blending) | |
|---|---|
| Waste magnetic tapes heated: | 100 parts by weight |
| Acetylene carbon black: | 20 parts by weight |
| Moisture setting type polyurethane adhesive | 30 parts by weight |
| Total | 150 parts by weight |
| (Physical properties) | |
| Density | 0.44 g/cm$^3$ |
| Compressive strength | 7.5 kg/cm$^2$ |
| Bending strength | 13.0 kg/cm$^2$ |
| Heat conductivity | 0.041 kcal/m °C. h |
| Attenuation in sound absorbing performance | 30 dB |
| Volume resistance | 5.99 × 10$^6$ Ω-cm |

[Embodiment 4]

| (Blending) | |
|---|---|
| Waste magnetic tapes heated: | 100 parts by weight |
| Acetylene carbon black: | 20 parts by weight |
| Stainless powder: | 60 parts by weight |
| Moisture setting type polyurethane adhesive | 40 parts by weight |
| Total | 220 parts by weight |
| (Physical properties) | |
| Density | 0.55 g/cm$^3$ |
| Compressive strength | 9.1 kg/cm$^2$ |
| Bending strength | 11.6 kg/cm$^2$ |
| Heat conductivity | 0.048 kcal/m °C. h |
| Attenuation in sound absorbing performance | 26 dB |
| Volume resistance | 2.99 × 10$^7$ Ω-cm |

[Embodiment 5]

| (Blending) | |
|---|---|
| Waste magnetic tapes heated: | 100 parts by weight |
| Phenolic type resin: | 30 parts by weight |
| Total | 130 parts by weight |
| (Physical properties) | |
| Density | 0.045 g/cm$^3$ |
| Compressive strength | 8.7 kg/cm$^2$ |

-continued

| | |
|---|---|
| Bending strength | 14.3 kg/cm² |
| Heat conductivity | 0.043 kcal/m °C. h |
| Attenuation in sound absorbing performance | 30 dB |
| Volume resistance | <1 × 10⁹ Ω-cm |

The boards obtained in the embodiments 1 through 5 were those, for example, of 10 mm in thickness, 400 mm in depth and 400 mm in width.

Industrial Applicability

According to the present invention, waste magnetic tapes can be effectively utilized.

According to the method of treating waste magnetic tapes, curl-shaped contracted pieces are obtained, so that they can be effectively used as, for example, a raw material for manufacturing building material boards, a filler for being mixed into coating film, and the like.

Also, the building material boards obtained by the method of manufacturing building material boards of the present invention have voids, in which air is confined, therein, so that they are excellent in sound absorbing and heat insulation performance, as well as static electricity preventive performance. Further, waste magnetic tapes are used as raw manufacturing material, so that they are excellent in electromagnetic wave absorbing performance.

What is claimed is:

1. A method for treating waste magnetic tapes comprising cutting or crushing said waste magnetic tapes into pieces having a length of from 1 mm to 50 mm and heating said pieces to a temperature of from 100° C. to 200° C. so that said pieces contract into a curled form.

2. The method for treating waste magnetic tapes according to claim 1, wherein said waste magnetic tapes are obtained from video tapes or cassette tapes.

3. The method for treating waste magnetic tapes according to claim 1, wherein said heating occurs in an electric furnace.

4. The method for treating waste magnetic tapes according to claim 1, wherein the temperature is in the range of 140° to 200° C.

5. A method for manufacturing a building material board from waste magnetic tapes comprising cutting or crushing said waste magnetic tapes into pieces of a proper size, heating said pieces so that they contract into a curled form, mixing them with a binder to form a mixture and molding the mixture under pressure.

6. The method for manufacturing a building material board according to claim 5, wherein said waste magnetic tapes are obtained from video tapes or cassette tapes.

7. The method for manufacturing a building material board according to claim 5, wherein said proper size is from 1 mm to 50 mm in length.

8. The method for manufacturing a building material board according to claim 5, wherein the temperature of said heating is from to 100° C. to 200° C.

9. The method for manufacturing a building material board according to claim 5, wherein said proper size is from 1 mm to 50 mm in length and the temperature of said heating is from 100° C. to 200° C.

10. The method for manufacturing a building material board according to claim 5, wherein said binder is a material that is moldable and curable at room temperature or is a material that is moldable and curable by heating.

11. The method for manufacturing a building material board according to claim 5, wherein said proper size is from 1 mm to 50 mm in length, the temperature of said heating is from 100° C. to 200° C., and said binder is a material that is moldable and curable at room temperature or is a material that is moldable and curable by heating.

12. The method for manufacturing a building material board according to any one of claims 5 to 11, wherein said binder is latex, liquid rubber, a polyurethane adhesive, an epoxy resin, a melamine resin, a phenolic-type resin or a urea resin.

13. The method for manufacturing a building material board according to any one of claims 5 to 11, wherein said binder is added to said pieces of waste magnetic tape in an amount of from 3 to 70 parts by weight of said binder to 100 parts by weight of said pieces.

14. The method of manufacturing a building material board according to claim 13, wherein said waste magnetic tapes are obtained from video tapes or cassette tapes.

15. The method for manufacturing a building material board according to claim 13, further comprising adding a substance having electromagnetic wave properties which is selected from the group consisting of ferrite, carbon black, a conductive metallic powder, a conductive metallic fiber, and a conductive metallic wire mesh having a mesh size of from 12 to 100, prior to mixing.

16. The method for manufacturing a building material board according to claim 12, wherein said binder is added to said pieces of waste magnetic tape in an amount of from 3 to 70 parts by weight of said binder to 100 parts by weight of said pieces.

17. The method for manufacturing a building material board according to claim 14, further comprising adding a substance having electromagnetic wave properties which is selected from the group consisting of ferrite, carbon black, a conductive metallic powder, a conductive metallic fiber, and a conductive metallic wire mesh having a mesh size of from 12 to 100, prior to mixing.

* * * * *

UNITED STATES PATENT AND TRADEMARK OFFICE
CERTIFICATE OF CORRECTION

PATENT NO. : 5,660,775
DATED : Aug. 26, 1997
INVENTOR(S) : Kasahara et al.

It is certified that error appears in the above-indentified patent and that said Letters Patent is hereby corrected as shown below:

On the title page, Item [73] Assignee as follows:

-- [73] Assignee: Fuji Kasei Kogyo Co., Ltd., Tottori-ken, Japan;

and Nihon Cement Co., Ltd., Tokyo, Japan --

Signed and Sealed this

Twenty-fourth Day of February, 1998

Attest:

BRUCE LEHMAN

Attesting Officer

Commissioner of Patents and Trademarks